Figure 1:
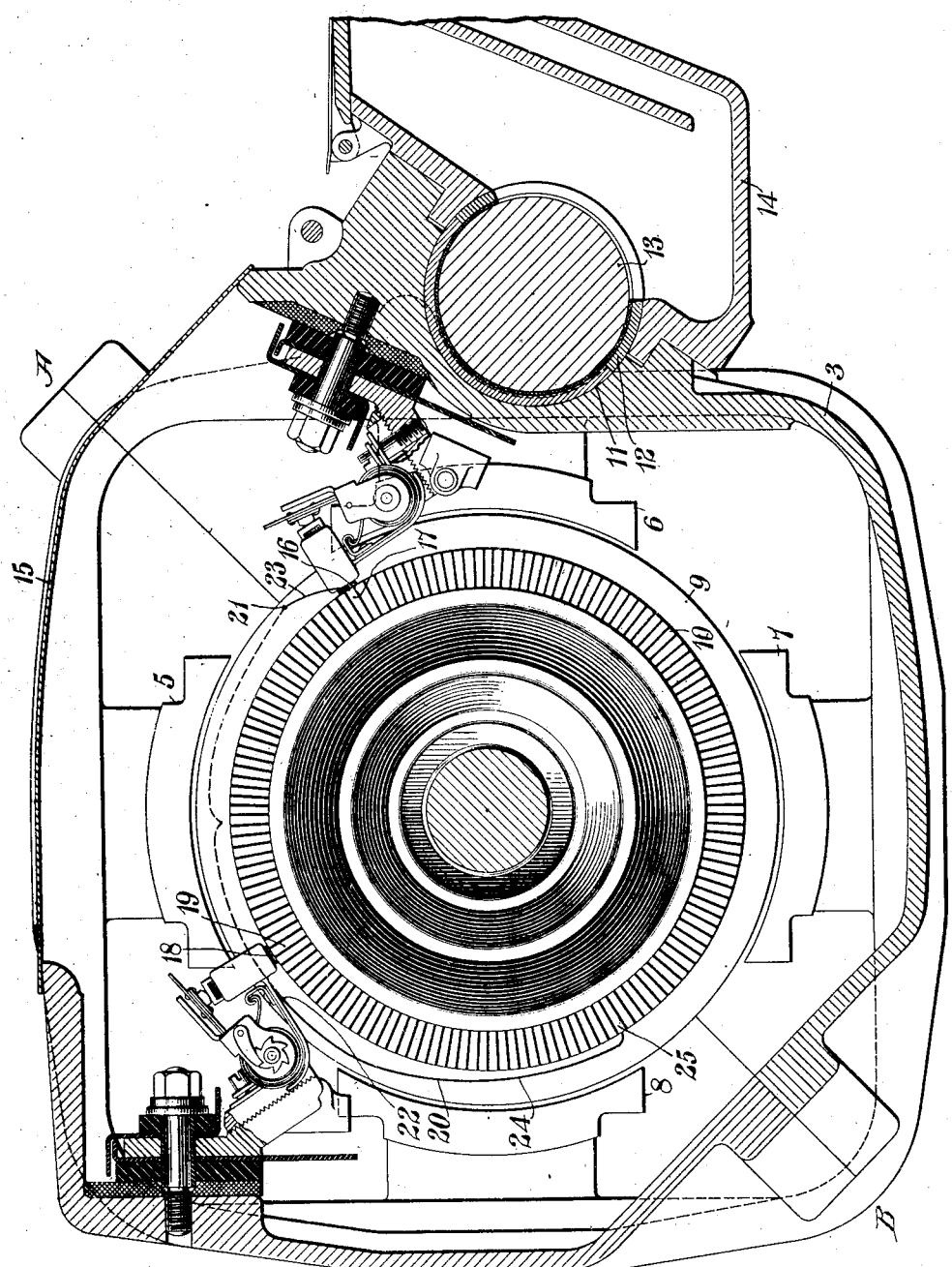

J. E. WEBSTER.
ARMATURE WINDING FOR ELECTRIC MOTORS.
APPLICATION FILED JUNE 19, 1905.

999,928.

Patented Aug. 8, 1911.

3 SHEETS—SHEET 1.

WITNESSES:
C. L. Belcher
Otto S. Schairer.

INVENTOR
John E. Webster
BY
Wesley G. Carr
ATTORNEY

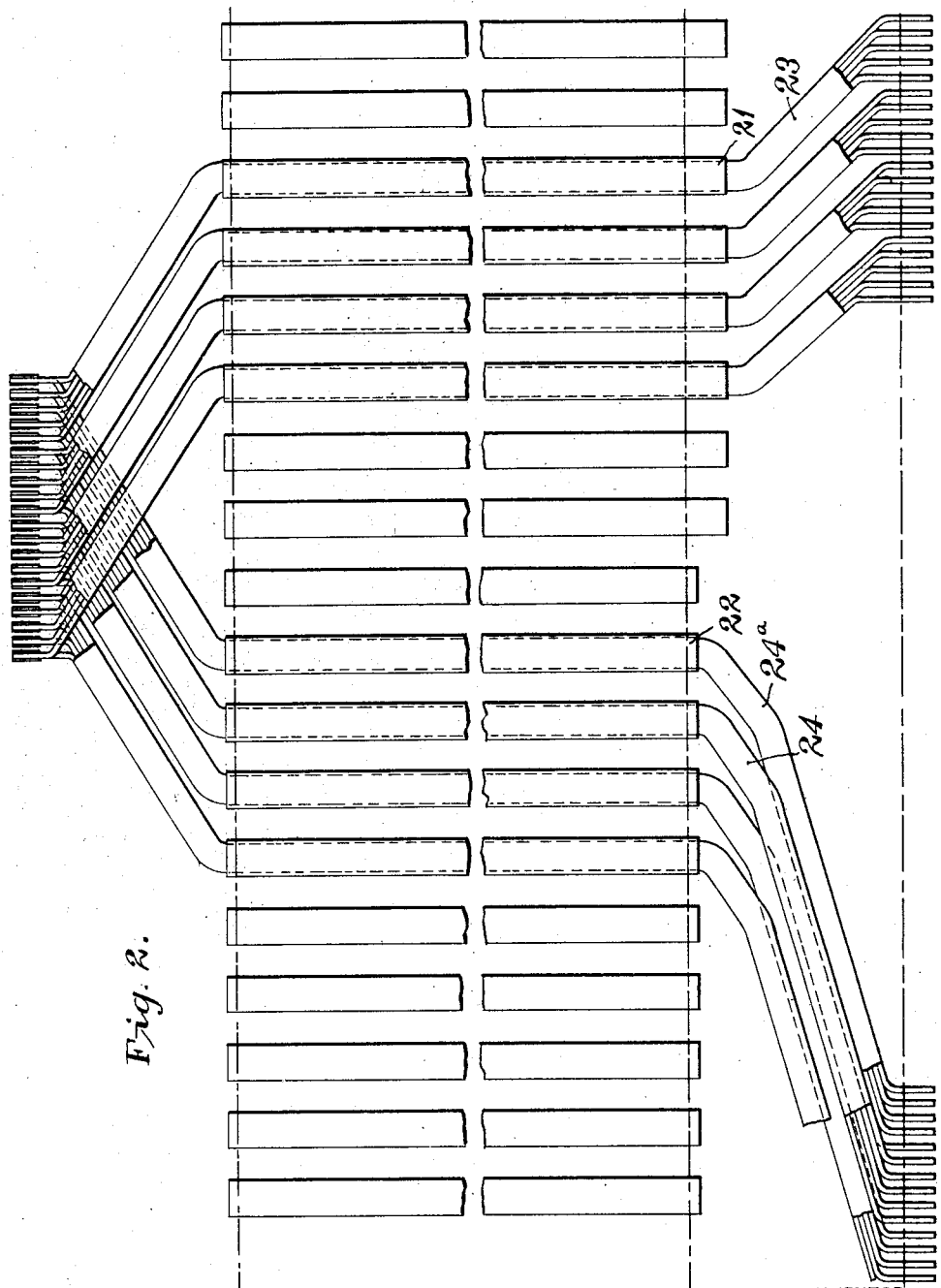

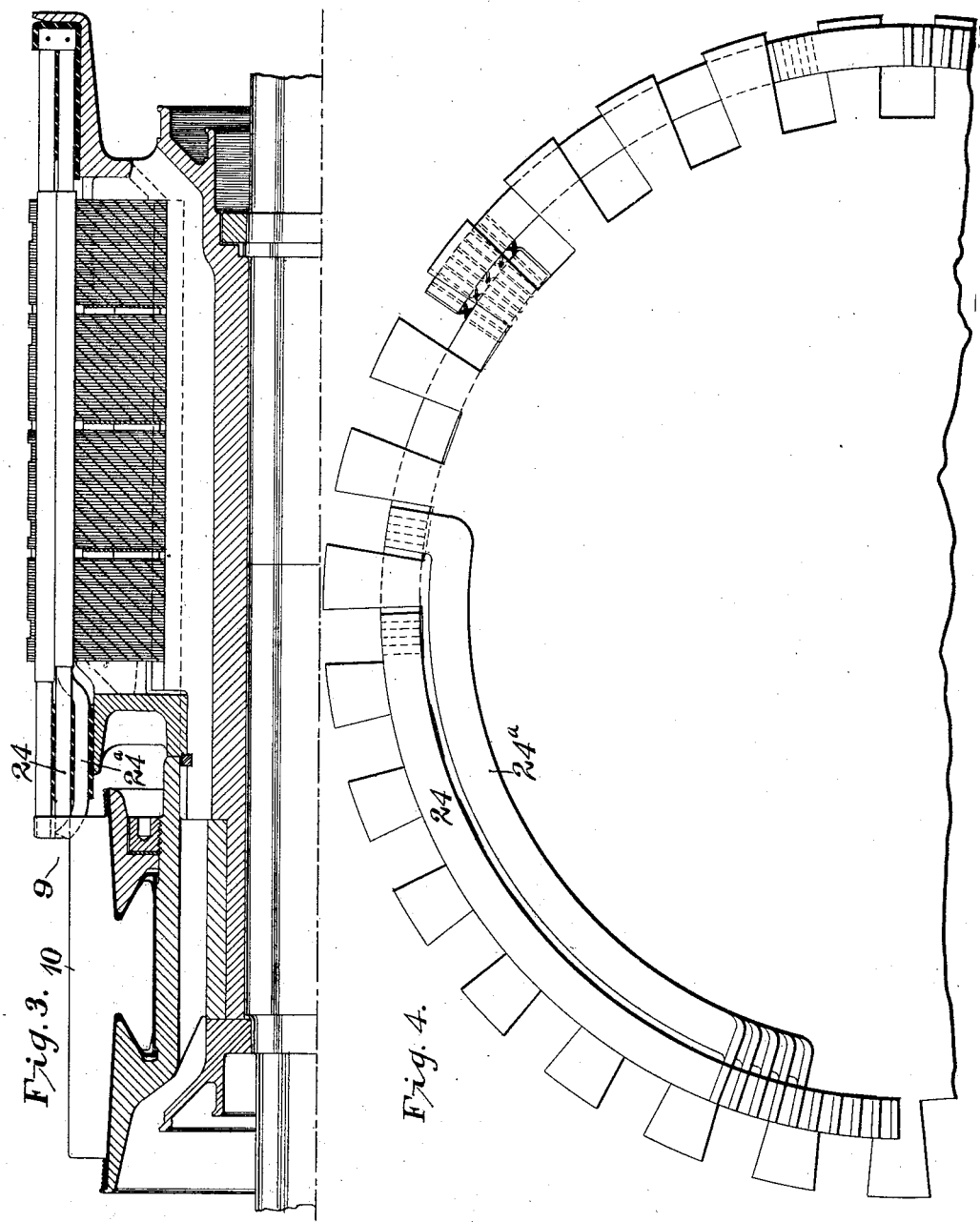

UNITED STATES PATENT OFFICE.

JOHN E. WEBSTER, OF PITTSBURG, PENNSYLVANIA, ASSIGNOR TO WESTINGHOUSE ELECTRIC & MANUFACTURING COMPANY, A CORPORATION OF PENNSYLVANIA.

ARMATURE-WINDING FOR ELECTRIC MOTORS.

999,928.  Specification of Letters Patent.  Patented Aug. 8, 1911.

Application filed June 19, 1905. Serial No. 265,982.

*To all whom it may concern:*

Be it known that I, JOHN E. WEBSTER, a citizen of the United States, and a resident of Pittsburg, in the county of Allegheny and State of Pennsylvania, have invented a new and useful Improvement in Armature-Windings for Electric Motors, of which the following is a specification.

My invention relates to windings for the armatures of dynamo-electric machines, and it has for its object to provide an improved form of winding for use in specially constructed machines.

The field magnet frames of electric railway motors, as heretofore constructed, have usually been divided into two parts, the planes of division being horizontal, or nearly horizontal, while the center lines of the polar projections have usually been disposed at approximately 45° angles with the vertical. Recesses are commonly provided in field magnet frames for the reception of bearings for the driving axles and the planes of division of the frames have usually divided these recesses. In the practical operation of these motors, it has been found that lubricating oil from the driving axle bearings is liable to leak through the breaks in the recesses into the interiors of the motors and damage the insulation of the field magnet windings. Electric motors have also been constructed in which the splitting of the field magnet frames through the recesses for the axle bearings is avoided by means of special constructions and arrangements of parts. In one of these motors, the field magnet polar projections are disposed with their center lines horizontal and vertical and the field magnet frame is divided in a plane disposed at about 45° from the vertical. The recesses for the driving axle bearings are placed at the base of one of the lateral polar projections, the space between the commutator cylinder and the field magnet frame being thereby reduced directly in front of the middle planes of the polar projections, where the commutator brushes should normally be located. In the motor in question, the brushes are shifted to one side of the middle planes of the polar projections and the winding constituting my invention is applied to the armature core.

My invention is illustrated in the accompanying drawings, Figure 1 of which is a transverse, sectional view through one end of an electric motor constructed in accordance therewith. Fig. 2 is a view, in development, of a winding as applied to the armature core. Fig. 3 is a longitudinal, sectional view through one-half of the armature and commutator of the motor shown in Fig. 1, and Fig. 4 is a view, in end elevation, of a part of an armature with some of the coils of the winding applied thereto.

The field magnet frame of a motor 1 is divided into two parts 2 and 3 in a plane indicated by the line A—B, which, when the motor occupies its normal position on the trucks of a railway vehicle, is disposed at an angle of about 45° with the vertical. The field magnet frame is provided with polar projections 5, 6, 7 and 8, the center line of the polar projections 5 and 7 being approximately vertical and the center line of the polar projections 6 and 8 being approximately horizontal when the motor is mounted in its normal position upon the vehicle truck (not shown). An armature 9 is rotatably mounted within the space between the polar projections, and the terminals of its winding, which will be more fully described hereinafter, are connected to the bars of a commutator cylinder 10. A recess 11 is provided in the portion 3 of the field magnet frame, at the base of the polar projection 6, for the reception of journal boxes 12 for a driving axle 13. An axle cap 14 is fastened to the portion 3 of the field frame in any suitable manner and serves to secure the journal box 12 in the recess 11.

In railway motors and other motors which are adapted for either forward or reverse armature rotation without shifting the brushes, the normal positions of the brushes are directly opposite the middle planes of the polar projections, but in the motor here shown, it is quite impractical to locate a brush directly opposite the middle of the polar projection 6, on account of the limited space between the commutator cylinder 10 and the indented portion of the field magnet frame that is made necessary by the recess 11. It is also desirable in practice that the commutator brushes be placed in such positions that ready access may be had thereto for purposes of inspection and repairs through a hand-hole, which is provided with a cover 15, the location of the hand-hole in this instance being determined by other practical considerations. Accordingly, a brush 16 is located so that when the motor is at rest it engages bar 17 of the commutator cylinder 10, which is displaced from the usual brush position by a suitable angle, and a second brush 18 engages commutator bar 19 at a position located 90° from the bar 17.

For the purposes of illustration, I have shown, diagrammatically, in Fig. 1, an armature coil 20 one terminal of which is connected to the commutator bar 17 at the moment that it engages brush 16. The sides 21 and 22 of the coil 20 are located in the armature slots which respectively lie approximately midway between adjacent tips of the polar projections 5 and 6 and adjacent tips of the polar projections 5 and 8, the side 21 being connected, by means of the relatively short portion 23, with commutator bar 17, and the side 22 being connected, by means of a longer portion 24, with commutator bar 25, the remainder of the coil being of the usual or any other desired structure. The length of the portion 24 exceeds that of the relatively shorter portion 23 by an amount approximately equal or proportional to twice the arc by which the brushes are displaced from their more usual positions directly in front of the middle planes of the polar projections.

In Fig. 2 is shown a diagrammatic development of several coils of the winding, in which the relative lengths of the portions 23 and 24 are clearly shown, the distance between the side 21 and the point of connection of the conductor with the commutator bar 17 being considerably less than the distance between the side 22 and the point of connection with the commutator bar 19. The longer of the end portions of the coils must evidently be bent at greater angles with the straight portions that are located in the armature slots than are the shorter end portions, and the distance between the commutator and the armature core is determined by the compactness with which these longer portions are placed in this space. In order to reduce the distance between the commutator cylinder and the armature core, I propose to displace the positions of some of the longer end portions with respect to the positions of the remainder of them, as indicated in Figs. 2, 3 and 4, where the coil portions 24ª are shown as bent adjacent to the ends of the core slots so that arc shaped spaces that they occupy shall be inside those occupied by the portions 24. The longer end portions may therefore be bent at greater angles with the straight side portions than would otherwise be the case, and a very compact structure is thus provided.

While the coils may assume any desired shape, I prefer to so form them that the straight sides of the conductors which join the shorter end portions may be located in the upper portions of the core slots, and the opposite sides of the coils, or those which join with the longer end portions, may be located in the lower portions of the core slots. The remaining portions of the coils may be of the ordinary form and structure or may be altered to suit other desired conditions without affecting the scope of my invention.

I claim as my invention:

1. The combination with a commutator cylinder, of an armature core and a winding therefor comprising a plurality of coils the lengths of the end portions of which are unequal and adjacent groups of the longer end portions of which are displaced with respect to each other.

2. The combination with a commutator cylinder, of an armature core and a winding therefor comprising a plurality of coils the lengths of the end portions of which are unequal and some of the longer end portions of which are bent inwardly to occupy a different arc from that of the remainder of the longer end portions.

3. The combination with a commutator cylinder, of an armature core and a winding therefor comprising a plurality of coils the lengths of the end portions of which are unequal and alternate groups of the longer end portions of which are bent inwardly to a different arc from that of the remaining groups.

4. The combination with a commutator cylinder, of a slotted armature core and a winding therefor comprising a plurality of coils opposite sides of which are located, respectively, in the upper and lower portions of the armature slots, the end portions that connect the sides in the upper portions of the armature slots with the commutator segments being shorter than the end portions that connect the sides in the lower portions of the armature slots with the commutator segments and adjacent groups of the longer end portions being displaced with respect to each other.

5. The combination with a commutator cylinder, of a slotted armature core and a winding therefor comprising a plurality of coils opposite sides of which are located, respectively, in the upper and lower portions of the armature slots, the end portions that connect the sides in the upper portions of the armature slots with the commutator segments being shorter than the end portions that connect the sides in the lower portions of the armature slots with the commutator segments, some of the longer end portions being displaced radially with reference to the remaining longer end portions.

In testimony whereof, I have hereunto subscribed my name this 15th day of June, 1905.

JOHN E. WEBSTER.

Witnesses:
MALCOLM MACLAREN,
BIRNEY HINES.